Jan. 19, 1965  E. J. SCHODER  3,166,462

METHOD AND APPARATUS FOR HEAT SEALING PACKAGES

Filed Nov. 1, 1961

United States Patent Office 3,166,462
Patented Jan. 19, 1965

3,166,462
METHOD AND APPARATUS FOR HEAT
SEALING PACKAGES
Eduard Josef Schoder, Stuttgart-Bad Cannstatt, Germany, assignor to Firma Fr. Hesser Maschinenfabrik-Aktiengesellschaft, Stuttgart-Bad Cannstatt, Germany, a corporation of Germany
Filed Nov. 1, 1961, Ser. No. 149,333
4 Claims. (Cl. 156—499)

This invention is concerned with methods and apparatus for heat sealing by welding the closures of packages composed of thermoplastic synthetic foil or sheet, for example polyethylene.

Known forms of apparatus for this purpose have pairs of heating and cooling elements and endless heat-resisting belts circulating in front of the heating and cooling surfaces of these elements. The packages which are to be closed are brought between these two belts in such a way that the closure sides thereof bear directly against the belts, and pass with these into the zone of the heating elements. Thus the folded corners or flaps making up the closure are first plasticized and then, after these folded parts have then been welded together, the packages pass between the cooling elements where the welded joints set.

In such apparatus the purpose of the two belts is to prevent direct contact between the heating elements and the closure flaps of the package envelopes since the latter readily remain stuck to the heating elements. The closure flaps stick to the belts on heating, but easily detach themselves when cooled.

In such apparatus, however, a disadvantage which has shown up is that with moderate heating temperatures layers of two-ply become welded, but greater multiple layers do not. By increasing the heating temperature, multiple layers of thicker cross section can be welded; thinner cross sections, however, may, as a result of the increased temperature to which the foil is submitted, portray pimpled deformations or even fuse altogether so that holes appear in the packaging envelope.

In order to avoid these drawbacks, in the method proposed by this invention the envelope is conducted to a first heating zone at which heat is applied to the fold-carrying parts of the envelope to initiate welding of said folds, and thereafter the envelope is conducted to a second heating zone at which pressure is applied to the laminations of the envelope with the simultaneous transfer of additional heat to these laminations to complete the welding.

This allows for the use of welding temperatures which are such that in the first heating zone only a limited amount of heat is transferred to the closure parts of the packaging envelopes so that the thinner cross sections of the closure folds do not completely fuse and the thicker closure cross sections are given a certain amount of preheating and, during the subsequent pressing operation, and in conjunction with the additional transfer of heat, the pre-heated thicker closure cross sections are securely and tightly sealed to one another.

In the performance of the method set out above, use is made of an apparatus comprising first heating means, a pressing device shaped to conform with the outline shape of multi-layers of the closure folds, means to apply said pressing device against the envelope and conveying means to traverse the envelope to and beyond said first heating means and pressing device.

Most conveniently this apparatus will conform with the well known arrangement in which the packages to be closed are held between two circulating belts and conducted first to heating devices and, optionally thereafter, to cooling means, so that these belts are located between the closure parts of the packaging envelopes which are to be heat sealed and the heating (and, if appropriate, the cooling) means.

To allow for transfer of additional heat to the work during the pressing operation in performing the process of this invention, the aforesaid pressing device may be furnished with auxiliary heating means, or alternatively heating of circulating belts may be continued so that they transfer the additional heat to this work at the pressing zone.

The pressing devices may take various forms. In one of these, for example, they may be constituted by die elements in the form of embossments on the surfaces of rotary cylinders, if the feed of the packages to be treated takes place uninterruptedly; where, however, the feed of the packages is intermittent, the die elements may be carried by plungers which are reciprocable in a direction transverse of the direction of travel of the packages.

The invention will now be explained with reference to the embodiments shown in the accompanying diagrammatic drawings, without being limited to the constructional details of these examples.

Figure 1:
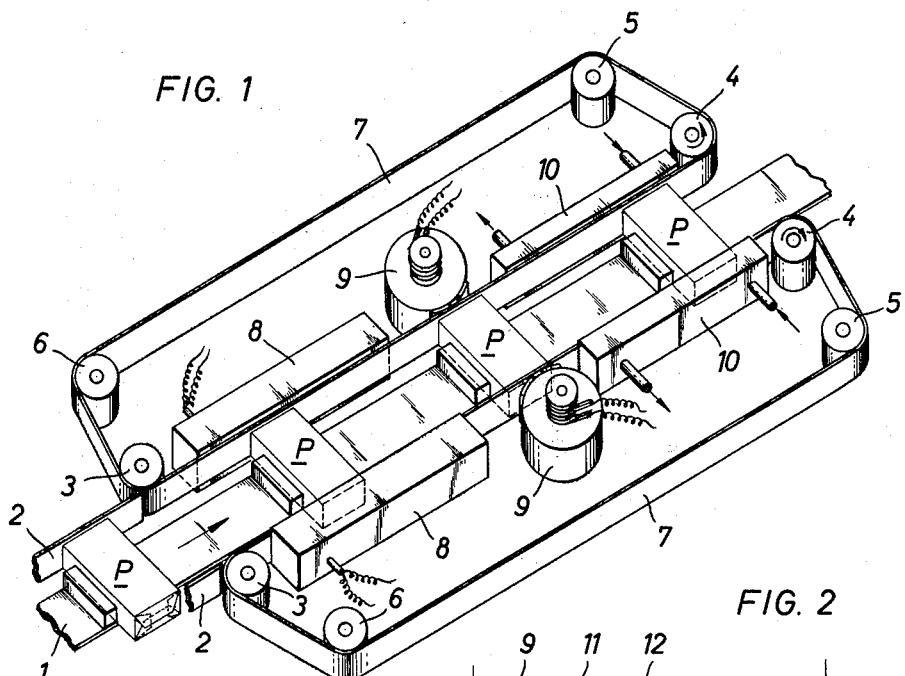
FIGURE 1 is a perspective illustration of one form of apparatus in accordance with the invention for welding the end closure folds of wrapper envelopes.

The apparatus illustrated in FIGURE 1, which is adapted to operate continuously, is particularly designed to weld and heat seal the end folds of wrapper envelopes. Pre-folded packages P are fed on a conveyor device, for example a conveyor belt 1, between presser bars 2, and pass thence between two belts 7 each running around a set of reversing rollers 3, 4, 5 and 6 and constituted of glass fabric laminated with tetrafluoroethylene. These belts 7 which, between the respective pairs of rollers 3 and 4, run parallel to one another at a distance apart corresponding to the length of a package P, bear against the closure folds of the ends of the packages.

As these packages are conducted in the direction of the arrow they come into indirect contact first with heating plates 8 arranged at the two sides of the conveyor path, then with rotating dies 9 heated in suitable fashion, and finally with cooling plates 10. Heat is transferred to the closure folds of the packages P from the heating plates 8, through the belts 7, in the zone of the plates 8.

The amount of heat transmitted by the heating plates 8 at the temperature to which the latter are conveniently set, is, however, not sufficient to heat and seal together the superimposed, and therefore thicker, layers of closure folds. It is only when additional pressure and heat are transmitted by the heated dies 9 to these thicker laminations that the individual layers thereof become plastic and unite.

Figure 2:
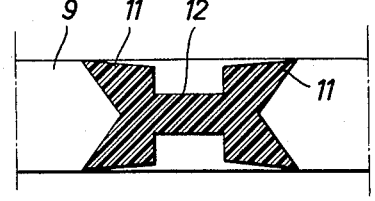
FIGURE 2 is a front view of part of a presser die used in this apparatus.

The surfaces of the dies 9, which in FIGURE 1 are in the form or rotary cylinders, have surface parts in relief which are of a shape corresponding to the outline shape of the zones of the thicker, multiple layers of the closure folds of the packages. This shape (see FIGURE 2) is composed of two dovetail-section parts 11 and a connecting web 12, corresponding to the diagonal folding of the closure folds of the packages P, which can be seen in the case of the left hand package in FIGURE 1.

During the subsequent cooling, both of the belts 7 and the package closures, between the cooling plates 10, the surfaces of the belts 7 and the closure parts of the packages, which had adhered together during the heat transmission, free themselves.

The plates 8 and the dies 9 are heated by means of built-in electrical heating resistances but they can, of course, be heated by other means, for example by superheated steam, hot air, or hot fluids. The cooling plates 10 are preferably hollow and are maintained continuously at a low temperature by, for example, a cooling medium flowing therethrough; other suitable cooling means can, however, be used.

Figure 3:
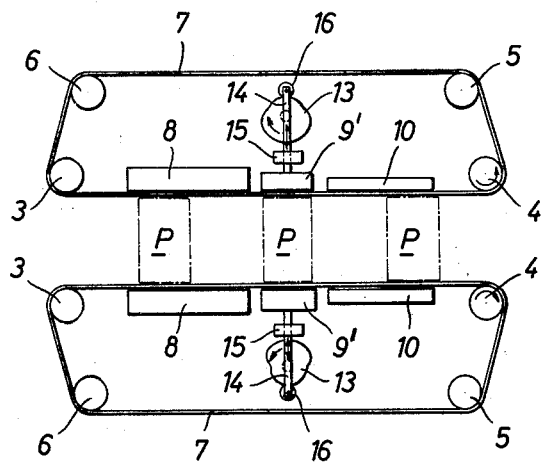
FIGURE 3 is a diagrammatic plan view of part of another embodiment of the invention.

In cases where the packages are to be fed intermittently by the conveyor through the apparatus, as may be convenient in some instances, the heated dies can be constituted by rectangular blocks 9' (see FIGURE 3) which are moved transversely, in timed relationship with the travel of the conveyor 1, so as to press periodically against the end closures of packages P. In the embodiment illustrated in FIGURE 3 each die block 9' is carried by a plunger 14 which is slidable in a guide bearing 15 transversely to the path of travel of the conveyor 1 and carries at its outer end a roller 16 which runs on the profiled edge of an operating cam 13 coupled to the drive of the conveyor 1.

The apparatus according to the invention can of course be used, by appropriately adapting the parts, for heat sealing laminated folds of other forms of thermoplastic envelopes, e.g. the closures of bags, in which instances the heating elements, heated dies and cooling elements are not essentially used in pairs; these elements can be provided at one side only of the path of travel of the bags and counter-pressure plates at the opposite side.

The use of cooling elements after the heating elements and heated dies is, of course, not necessary in all instances, depending on the characteristics of the thermoplastic foils or sheets to be welded.

I claim:

1. Apparatus for heat sealing a folded unsealed end of a thermoplastic package, said end having a folded form constituted by differing numbers of overlapped thicknesses of material, said apparatus comprising: conveyor means for advancing the package in a longitudinal direction with the folded end of said package facing transversely, a heating plate located along the path of travel of the package such that the end of the package passes the heating plate, a pressing member located downstream of the heating plate relative to the direction of travel of the package, a belt, means for driving the belt between the path of the end of the package and the heating plate and pressing member to cause the belt to be heated by the heating plate and in turn transfer heat to the end of the package in a quantity sufficient to preheat the folded end of the package while avoiding fusing of the material thereof and means supporting said pressing member to urge the same into pressure contact with the belt which in turn contacts the end of the package, said pressing member having a raised surface in the form of the outline of the multiple thicknesses of overlapped material to press the thus heated belt against the preheated end of the package only against the multiple thicknesses of overlapped material to complete heat sealing of the overlapped thicknesses of material of the end of the package.

2. Apparatus as claimed in claim 1 comprising cooling means located downstream of the pressing member for cooling the belt and the end of the package to facilitate separation of the same.

3. Apparatus as claimed in claim 1 wherein said pressing member is a cylindrical die and said means which supports the pressing member supports the same for rotation.

4. Apparatus as claimed in claim 1 wherein said pressing member is a rectangular block member, and said means which supports the pressing member supports the same for reciprocal movement towards and away from the belt.

References Cited by the Examiner
UNITED STATES PATENTS

| | | | |
|---|---|---|---|
| 2,357,786 | 9/44 | Wells | 156—498 X |
| 2,441,940 | 5/48 | Rohdin | 156—289 |
| 2,511,703 | 6/50 | Ettl | 156—311 X |
| 2,597,634 | 5/52 | Grevich | 156—386 X |
| 2,680,470 | 6/54 | Stanton | 156—498 |
| 2,697,473 | 12/54 | Techtmann | 156—498 |
| 3,007,835 | 11/61 | Rosenberg | 156—359 X |

EARL M. BERGERT, *Primary Examiner.*